United States Patent
Laserson et al.

(10) Patent No.: US 12,014,383 B2
(45) Date of Patent: Jun. 18, 2024

(54) PLATFORM-BASED CROSS-RETAIL PRODUCT CATEGORIZATION

(71) Applicant: NCR Voyix Corporation, Atlanta, GA (US)

(72) Inventors: Itamar David Laserson, Givat Shmuel (IL); Rotem Chudin, Kfar-Saba (IL); Julie Dvora Katz Ohayon, Ashdod (IL); Moshe Shaharur, Tel-Aviv (IL)

(73) Assignee: NCR Voyix Corporation, Atlanta, GA (US)

( * ) Notice: Subject to any disclaimer, the term of this patent is extended or adjusted under 35 U.S.C. 154(b) by 204 days.

(21) Appl. No.: 17/084,780

(22) Filed: Oct. 30, 2020

(65) Prior Publication Data
US 2022/0138772 A1     May 5, 2022

(51) Int. Cl.
*G06Q 30/02* (2023.01)
*G06F 16/28* (2019.01)
*G06F 16/955* (2019.01)
*G06K 19/06* (2006.01)
*G06N 20/00* (2019.01)
*G06Q 10/087* (2023.01)
(Continued)

(52) U.S. Cl.
CPC ....... *G06Q 30/0201* (2013.01); *G06F 16/285* (2019.01); *G06F 16/9554* (2019.01); *G06K 19/06028* (2013.01); *G06N 20/00* (2019.01); *G06Q 10/087* (2013.01); *G06Q 10/10* (2013.01); *G06Q 30/0185* (2013.01); *G06Q 30/0204* (2013.01)

(58) Field of Classification Search
CPC ................................. G06Q 30/02; G06F 16/28
USPC ........................................................ 705/7.33
See application file for complete search history.

(56) References Cited

U.S. PATENT DOCUMENTS 10,873,456 B1 * 12/2020 Dods ...................... G06N 20/00
2019/0244436 A1 * 8/2019 Stansell .................. G06T 19/20
(Continued)

OTHER PUBLICATIONS

Rohit Kaul et al: "Automatic Product Classification and Clustering Solutions in a Retail Context", Decision Support Systems, Jan. 1, 2013 (Jan. 1, 2013), XP055571069, Retrieved from the Internet: URL:http://cs229.stanford.edu/proj2013/Bha tejaKaul-AutomaticProductClassificationAnd Clustering.pd£ [retrieved on Mar. 19, 2019].
(Continued)

*Primary Examiner* — Nga B Nguyen
(74) *Attorney, Agent, or Firm* — Schwegman Lundberg & Woessner, P.A.

(57) ABSTRACT

A culture is defined that spans multiple retailers. Transaction data from the multiple retailers are processed to map barcoded item codes to a culture item vector space. Any non-barcoded item for a given retailer associated with the culture is linked to a most similar barcoded item of that retailer based on a retailer-specific item vector space. The distances between the mapped barcoded item codes of the culture item vector space are processed to cluster the barcoded item codes into classifications within the culture vector space. Each retailers non-barcoded items are associated to the classifications of the culture item vector space based on their linkages to the retailers' specific barcoded items, which are already mapped within the culture item vector space. Each item code of a given retailer's item catalogue is linked to its corresponding classification.

20 Claims, 4 Drawing Sheets

(51) Int. Cl.
    *G06Q 10/10*     (2023.01)
    *G06Q 30/018*     (2023.01)
    *G06Q 30/0201*     (2023.01)
    *G06Q 30/0204*     (2023.01)

(56) References Cited

U.S. PATENT DOCUMENTS

2021/0192429 A1*   6/2021   Bhat .................. G06N 20/20
2021/0304121 A1*   9/2021   Lee .................. G06F 16/215

OTHER PUBLICATIONS

Ioannis Partalas et al: "e-commerce product classification: our participation at cDiscount 2015 challenge", arxiv.org, Cornell University Library, 201 Olin Library Cornell University Ithaca, NY 14853, Jun. 9, 2016 (Jun. 9, 2016), XP080706941, * p. 1, paragraph 2 *.

Domenico Beneventano et al: "A Web Service based framework for the semantic mapping amongst product classification", Journal of Electronic Commerce Research, vol. 5, No. 2, May 2004 May 1, 2004 (May 1, 2004), pp. 114-127, XP055381232, Retrieved from the Internet: URL:http://www.jecr.org/sites/default/file s/05_2_p04_0.pdf.

Abbott Alastair A et al: "Ontology-Aided Product Classification: A Nearest Neighbour Approach" , Sep. 12, 2011 (Sep. 12, 2011), Advances in Biometrics : International Conference, ICB 2007, Seoul, Korea, Aug. 27-29, 2007 ; Proceedings; [Lecture Notes in Computer Science; Lect. Notes Computer], Springer, Berlin, Heidelberg, pp. 348-362, XP047427697, ISBN: 978-3-540-74549-5.

EP Search Report.

* cited by examiner

PLATFORM-BASED CROSS-RETAIL PRODUCT CATEGORIZATION

BACKGROUND

Product classification is essential to many aspects of sales industries, such as retail. Product categorization is typically performed manually and a priory by catalog experts based on product character and purpose. Poor product classification leads to poor decision-making across all retail segments resulting in considerable lost revenue.

Categorization is important in retail business decision-making process. Product classification is essential to almost any aspects of the retail industry, including merchandising, inventory management, product shelf placement, promotion management, reporting, analytics and e-commerce. Poor product classification leads to poor decision-making in almost every aspect of the retailers' operation, costing the industry Billions of dollars.

Retailers are currently paying double. On one hand, they hire catalog experts to deductively create and maintain merchandise hierarchies, based on their own presumed knowledge on products' nature. On the other hand, they often pay indirectly for having non-accurate or non-optimal product classification.

Some key examples that demonstrate the importance of product categorization: merchandising, inventory management, product shelf placement, promotion management, and e-commerce.

In Merchandising, it is important to understand and study the relations between products to design a catalog that optimizes the store's sales. When considering adding new items, some items may increase the overall sales of a store while others may sell well but cannibalize the sales of existing similar items instead of increasing the overall sales.

In Inventory management, when a certain item is out of stock, to avoid losses, it should be replaced with the most similar item. It is not always easy for store manager to locate similar products.

In product shelf placement, to maximize store sales it is important to place products in strategic locations with proximity to products within their most common basket context.

In promotion management, understanding the affinity between products is important, To maximize the profit, it is more effective to spread promotions across different categories instead of stacking multiple promotions in the same category.

In e-commerce, the topic of product classification and clustering is central to providing a good user experience and intelligent search to increase revenue for e-commerce web sites. If the product category is correct it will allow scalability and reduce unintentional mis-classification, thus enhance user experience, customer satisfaction and higher transaction rates.

Again, current solutions rely heavily on catalog experts and their a-priory presumptions on product relations. Initial categorization of the catalog and item association to product class or category are currently done manually by those experts.

Yet, customer and marketing managers, merchandisers, inventory managers, e-commerce mangers and sales analysts—all rely on categorization and make numerous every-day decisions based on it.

SUMMARY

In various embodiments, methods and a system for a platform-based cross-retail product categorization is presented.

According to an aspect, a method for a platform-based cross-retail product categorization is presented. For example, barcoded item codes for multiple retailers are mapped into a culture-specific vector space based on transactions processed by the multiple retailers, Retailer-specific item codes for a given retailer are mapped into a given retailer-specific vector space. A non-barcoded item code is identified from the retailer-specific item codes mapped within the given retailer-specific vector space, A select retailer-specific item code that is most similar to the non-barcoded item code within the given retailer-specific vector space is determined. The non-barcoded item code is linked to the select retailer-specific item code; the select retailer-specific item code is a particular barcoded item code that is mapped in the culture-specific vector space. The barcoded item codes are clustered within the culture-specific vector space into product categories.

DETAILED DESCRIPTION

Figure 1A:
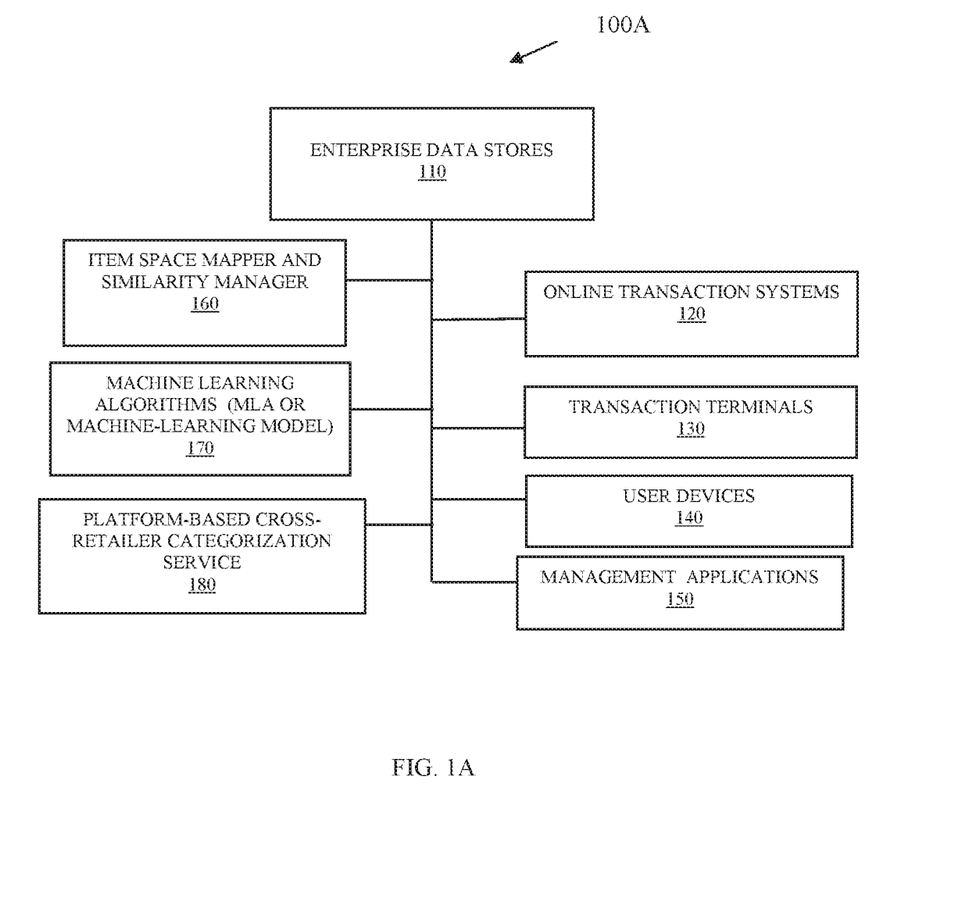
FIG. 1A is a diagram of a system for a platform-based cross-retail product categorization, according to an example embodiment.

FIG. 1A is a diagram of a system 100 for a platform-based cross-retail product categorization, according to an example embodiment. It is to be noted that the components are shown schematically in greatly simplified form, with only those components relevant to understanding of the embodiments being illustrated.

Furthermore, the various components (that are identified in the FIGS. 1A and 1B) are illustrated and the arrangement of the components is presented for purposes of illustration only. It is to be noted that other arrangements with more or less components are possible without departing from the teachings of real-time alerts of a platform-based cross-retail product categorization presented herein and below.

As will be discussed in greater detail herein and below, system 100A provides a retail-service platform that provides culture-based product categorization. The platform hosts multiple tenants (customers or retailers and their business/transaction environment). This provides a large enough number of customers with extensive data (transactions, catalogs, product/item prices, and promotions/discounts) of retail stores spread across the globe. For example, in a specific region, such as Atlanta, GA, the platform holds the above data for every store within the Atlanta region who is connected to its' platform. Data will include multiple stores across multiple cultures across multiple retailers. The majority of items in the product/item catalog already include manufacturer barcodes (Universal Product Codes (UPCs)). In other words, the same can of Coke® will have the same barcode in any store within a certain region regardless of which chain the store belongs to.

System 100A automatically produces product categorization based on store culture groups, instead of running categorization for each retailer separately which is solely based on that retailer's own stores. Each culture group is composed of all stores associated to that culture of all retailers that are connected to the platform. This provides a solution the problems presented above.

The system 100 provides a mechanism by which item codes of a product catalogue represents words. A transaction is comprised of the item codes representing the items of that transaction. The mixture or combination of item codes (words) in a given transaction represents a sentence. The item codes are assigned a vector representing a context in which the items that correspond to the item codes were purchased based on analysis of transactions for which the items were purchased. The item vectors represent positions within multidimensional space. Given a transaction having a basket of items, the corresponding item vectors are obtained for that transaction and probabilities that a next item to add to the transaction is produced and sorted in decreasing probabilities. As items are added or removed from a given transaction, the item vectors for the item codes change. At any given point in time, the probabilities between the item vectors and other item codes within the multidimensional space can be calculated. These probabilities are associated with items that are not in the present transaction but are likely to added next based on the context of the item vectors that comprise the present transaction. A configured threshold probability is set, such that when a given probability between item vectors plotted in the multidimensional space for the current transaction is at or below the threshold probability, an assumption is made that the item associated with the given probability should be recommended to be included within the current transaction as an item that a consumer should like to purchase with his/her transaction With cross-retail information stored in the platform, holding data from multiple customers (retailers), the data set per culture is expected to be large enough to produce an effective model that would serve even the smaller retailers. Larger retailers may associate their culturally diversified stores to multiple cultures so that different categorizations will apply to different culture groups with better optimization achieved.

Retailers that wish to consume the system's product categorization services are asked to provide the culture group of each of their stores out of a final set provided by the platform.

A Word2Vec algorithm provides a separate categorization for each of the culture groups, which is then maintained on an ongoing basis as new transactions are uploaded to the platform from all retailers connected to the platform.

This cross-retail Word2Vec model is based only on the items that hold manufacturer barcodes, since only those items share the same barcode across multiple retailers. Luckily these are the majority of the items in most retail segments, such as the grocery retail segment. The Word2Vec model is the same for all retailers but the categorization will unique per retail since each retailer has its' own product/item catalog, Eventually over time, the categorization service of the platform returns product categorization per specific retailer.

A separate technique is used for catching categorizations associated with products or items that lack any manufacturer barcode, Here, a first Word2Vec model is based on all stores within a certain culture group. Additionally, a second Word2Vec model is created for each retailer that is specifically based on their own stores. For every item that was not categorized by the culture-based Word2Vec model (items without manufacturer barcodes): that retailer's most similar item that does have a manufacturer barcode is identified based on item vectors plotted in multidimensional space; the item is then linked or categorized to the most similar item's category, which was found with the culture-based categorization. This 3-step process will provide an effective platform-based product categorization for customers that are too small or too culturally diversified to produce one using a single Word2Vec model.

System 100A provides a central data-driven catalog clustering tool/service that relies on the retailer's transaction data manager/module (TDM) and avoids reliance on catalog experts' presumptions. Similar products in the same cluster. The clustering service learns the relation between the products in the catalog based on all the transactions completed over an extended time-period. If products A and B tend to appear in similar baskets (or virtual carts) then they are considered to be "similar items." For example: "Barilla® Penne Pasta" and "DeCeco® Penne Pasta" will often appear in the same basket with items such as: tomato sauce, olive oil, parmesan cheese, etc. Thus, they are similar products. Provided with a large number of transactions detected in each retailer's TDM, enough data is accumulated to modulate and characterize the typical context of each item in the catalog. Items with similar contexts are identified as similar items. The Word2Vec algorithms categorize the products in the catalog.

Word2Vec is a group of algorithms used primarily in the field of natural language processing (NLP) for machine translation. Word2Vec takes as its input a large corpus of text and produces a vector space, typically of several hundred dimensions, with each unique word in the corpus being assigned a corresponding vector in the space. Word vectors are positioned in the vector space such that words that share common contexts in the corpus are located in close proximity to one another in the space. The "large corpus of text" is represented from data collected for transactions in each the retailer's TDM. The "sentences" that are provided as input are the transactions identified in that retailer's TDM. Furthermore, each transaction is defined as a set of items—"words." Eventually, each item in the catalog will be mapped to a vector with N dimensions (N is configurable). The vector represents the context of the item. The smaller the distance between a pair of vectors (representing a pair of items) the more similar those items are. With each item represented by a numeric vector, clustering becomes mathematical calculations to determine distances between plotted item vectors in the multidimensional space. A simple application of K-means clustering algorithm would cluster the catalog where each cluster contains items that are similar to one another. The number of clusters (K) is an input to the K-means algorithm.

This technique for clustering provides additional flexibility. A small K provides a good solution to product division to a small number of departments containing many items (for example dairy/vegetable/soft drinks departments, etc.). As K grows the algorithm outputs more clusters but also smaller and more accurate clusters (e.g.: Rigatoni® Pastas/Penne Pasta clusters, etc.).

catalog managers can use the clustering functionality to build their own merchandise hierarchies while avoiding the cost of hiring catalog experts. Further, catalog managers can use system 100A functionality on an ongoing basis to detect wrong item assignments and better tune their merchandise hierarchies. Additionally, E-commerce site managers can leverage better tuned and more precise clustering to build their e-commerce websites more accurately and increase the sales in this online channel.

System 100A identifies general culture groups from transaction data that spans multiple different retailers' transaction data. Each culture group is clustered using Word2Vec algorithm to identify categories or clusters of culture-specific related items. Any items that lack a manufacturer barcode are automatically identified (per retailer) and are excluded from the initial Word2Vec clustering approach. A second Word2Vec algorithm is used on a per-retailer bases for the non-barcoded items to cluster the non-barcoded items with the clustered barcoded items of the cultural-based clusters. This provides the retailers with product categories and classifications for their product catalogue, which is both on culture and based on their own product categories. Retailer stores can now make item promotion/marketing decisions, item shelf-placement decisions, item inventory decisions, and item e-commerce decisions based on the fine-grain product classifications/clusters.

It is within this context that FIGS. 1A, 1B, and 2-3 are now discussed.

System 100A comprises an enterprise data store 110, online transaction systems 120 that span multiple different retailers, in-store transaction terminals 130 associated with multiple different retailers, user devices 140 operated by multiple different customers and/or employees of multiple different retailers, management applications (apps) 150 associated with multiple different retailers, an item space mapper and similarity manager 160, one or more machine-learning algorithms (MLA) 170, and a platform-based cross-retailer categorization service 180. System 100A comprises a variety of computing devices, each of which comprises at least one processor and a non-transitory computer-readable storage medium comprising executable instructions. The executable instructions when executed by the corresponding processor from the corresponding non-transitory computer-readable storage medium causes that processor to perform operations discussed herein and below with respect to the components 110-180.

An "item code" represents an item from a given retailer's product catalogue. Each item code's affinity/similarity to the other item codes defines that item's vector in multidimensional space. The affinity/similarity and item code vector determined by Word2Vec algorithms based on analysis of the retailer's transaction histories and product catalogue. An "item vector" is a mathematical expression showing points within the multidimensional space representing the contexts of a given item.

Item space mapper and similarity manager 160 utilizes a plurality of Word2Vec algorithms for item codes of items. Each identified culture comprises its multidimensional space for plotted item vectors for the corresponding item codes. Each vector space is based on aggregated transaction data that spans transactions across multiple-retailers associated with a given culture. Each vector space per culture comprises mapped item vectors for barcoded items that span multiple retailers associated with the corresponding culture.

Item space mapper and similarity manager 160 also a separate Word2Vec algorithm specific to a given retailer's transaction data for both that retailer's barcoded items and any non-barcoded items to create a retailer-specific vector space with mapped non-barcoded item vectors and mapped barcoded item vectors for that retailer. This creates separate vector spaces specific to each retailer with mapped item vectors for barcoded items and mapped non-barcoded item vectors for non-barcoded items.

Platform-based cross-retailer categorization service 180 uses a given retailer's specific mapped vector space comprising that retailer's mapped barcoded item vectors and non-barcoded item vectors for purposes of determining most similar mapped barcoded items to the corresponding non-barcoded items. This is done by calculating the distance between a given non-barcoded item vector to a nearest plotted barcoded item vector within the retailer-specific vector space. To do this, platform-based cross-retailer categorization service 180 passes a non-barcoded item code and an identifier for the retailer-specific vector space to item space mapper and similarity manager 160. Item space mapper and similarity manager 160 obtains the corresponding retailer-specific vector space and uses the non-barcoded item code to obtain the non-barcoded item vector. Next, item space mapper and similarity manager 160 calculates distances within the retailer-specific vector space between the non-barcoded item vector and other barcoded and non-barcoded item vectors within that space to produce similarity scores. A higher score is indicative of a closer item vector to the non-barcoded item vector. A top percentage of the scores and the corresponding item codes associated with the scores are returned to platform-based cross-retailer categorization service 180 as output.

Platform-based cross-retailer categorization service 180 checks the returned item codes and similarity scores and identifies a closet or most similar match between the non-barcoded item code and a known barcoded item code. The non-barcoded item code is then linked to the barcoded item code from that retailer that was already mapped within the cultural-based vector space for a given culture by item space mapper and similarity manager 160.

In this way, all of a given retailer's item codes are either mapped directly within a given culture vector space associated with the retailer (for barcoded item codes) or mapped indirectly within the given culture vectors space through links between non-barcoded item codes to mapped barcoded item codes.

Next, each cultural based vector space is processed to cluster the mapped barcoded items and mapped non-barcoded items (mapped indirectly as discussed above) into clusters or categories, again based on distances between the item vectors within the vector space and based on a clustering algorithm (such as K-means discussed above). This produces categories that span multiple retailers and their transactions for a given culture and that is specific to a given retailer. The categories can then be pushed to a cross-retailer catalogue 190 (shown in FIG. 1B) for access by a given retailer for purposes of managing promotions, managing inventor, and managing e-commerce.

Each enterprise data store 110 includes a variety of enterprise data, such as transaction histories for transactions performed with a retailer. Other types of data may be included in enterprise data store 100 as well, such as incentives available to consumers, item prices for the transaction, customer data for known customers (loyalty data, profile data, etc.), the transaction details for transactions of customers (including item codes for items), item or product catalogue data, and other information captured and retained by the enterprise for the store and other stores associated with the enterprise (retailer).

Each online transaction system 120 comprises interfaces and corresponding software by which customers perform online transactions with a retailer, such as via browsing items, storing selected items in a virtual cart, and checking out (paying for) items in the virtual cart. The online transaction system 120 can be web-based and/or mobile app-based. Virtual cart data provided in real time from online transaction system 120 to enterprise data store 110 or provided via an Application Programming Interface (API) in real time to price alert manager 190 during an online shopping session.

Transaction terminals 130 comprise peripheral devices (scanners, printers, media acceptors/dispensers, weigh scales, Personal Identification Number (PIN) pads, card readers, etc.) and corresponding software for performing customer checkouts associated with transactions. Real-time item and transaction data provided by terminals to their corresponding enterprise data store 110.

User devices 140 comprise peripherals (touchscreens, cameras, etc.) and corresponding software for performing customer transactions using a web browser or a mobile application (app). Real time transaction data provided by any app to a corresponding retailer's enterprise data store 110.

Management applications 150 comprises retailer-specific interfaces and features/functions that permit employees of a corresponding retailer to monitor and adjust item pricing, product catalogues, monitor retailer assets, and manage retailer assets.

In addition, a machine-learning model may be provided as machine-learning algorithms (MLAs) 170, which are trained to assist in similar item detection and cluster classification. Actual results provided by users with respect to similar item detection and classifications can be fed back into the MLAs 170 for purposes of retaining the MLAs.

Once the product catalogue and transaction histories are processed to create the item code vectors for the items associated with a given vector space, item space mapper and similarity manager 160 can be provided a given item code (as input could be barcoded or non-barcoded), the given item code representing an item used in any given transaction. A configured number of N similar item codes can be identified based on distances between the given item's mapped context within the corresponding multidimensional space and other mapped items' contexts plotted within the same multidimensional space. The output produced by the Word2Vec algorithm is similar item codes (similar items) along with similarity scores (which correspond to the distances within the multidimensional space between the position of the provided item code and the positions of similar item codes).

The similar item codes and similarity scores can then be processed by platform-based cross-retailer categorization service 180 for purposes of identifying a similar barcoded item for a non-barcoded item and linking that non-barcoded item to the most similar barcoded item (when using the retailer-specific vector space). The similarity item codes, and similarity scores can also be processed by platform-based cross-retailer categorization service 180 to cluster (categorize) item codes within a given cross-retailer platform (when using the culture-specific vector space).

As system 100A is deployed, feedback is monitored from users (retailers). The feedback is an indication that a given item categorization was correct or incorrect in the view of the retailer and may include a corrected categorization believed to be more appropriate by the retailer for the item. One or more MLAs 170 are trained on input to provide a more-accurate classification for any given culture, given retailer, assigned classification, and item code based on the feedback. So, the MLAs 170 can be used to fine tune and customize the classifications based on feedback from the retailers in a manner that is specific to each retailer.

Figure 1B:
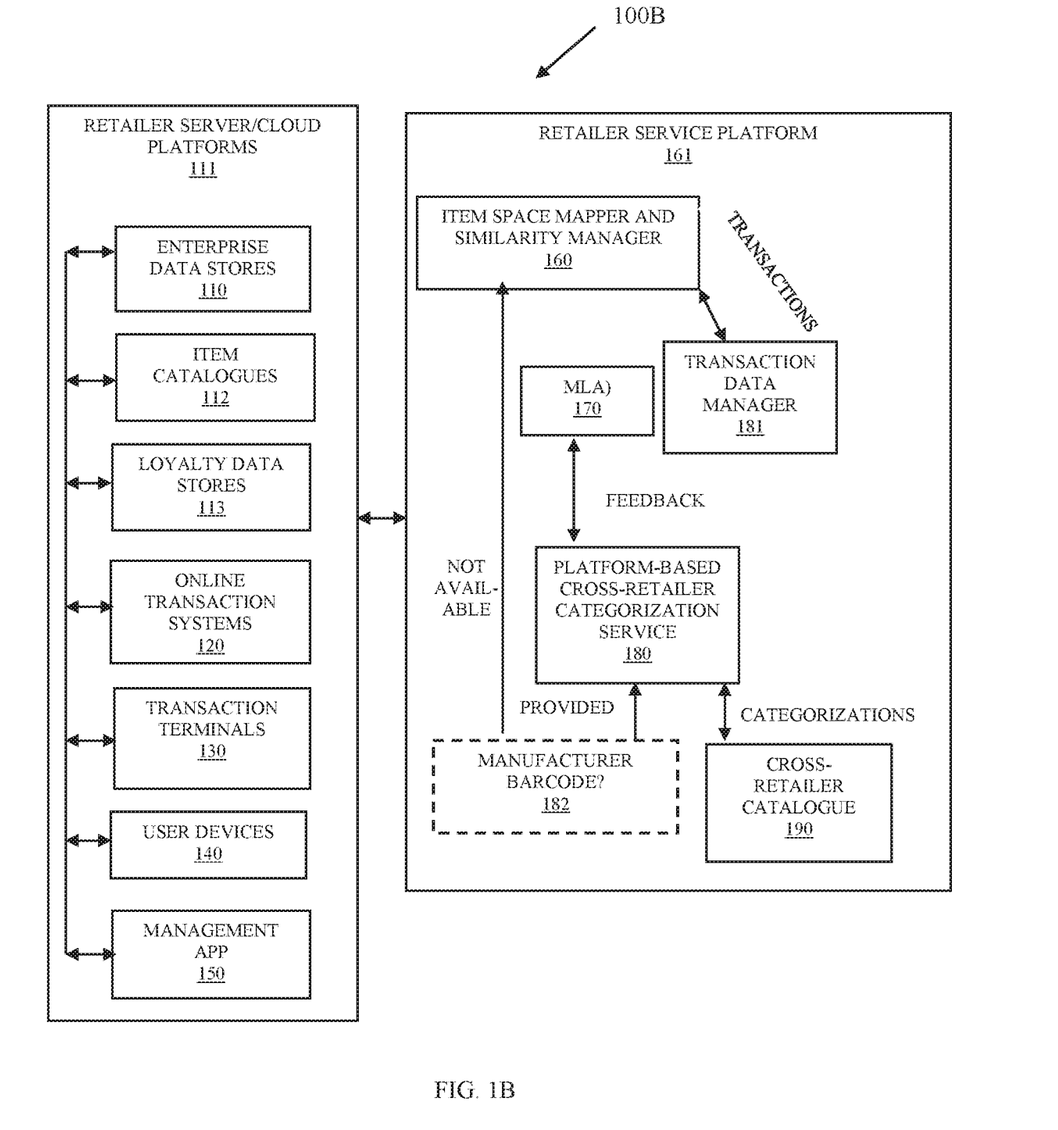
FIG. 1B is a diagram representing a process flow of the system of FIG. 1A, according to an example embodiment.

FIG. 1B is a diagram representing a process flow 100B of the system of FIG. 1A, according to an example embodiment.

FIG. 1B illustrates a more fine-grain view of some components associated with system 100A.

Each retailer has its own server/cloud platform/environment 111, which includes that retailer's enterprise data store 110, item catalogues 112, loyalty data stores 113, online transaction systems 120, transaction terminals 130, user devices 140, and management applications 150. Each retailer platform 111 is connected to a retailer-service platform 161 via an instance of a transaction data manager 181. Each retailer service platform 161 comprises item space mapper and similarity manager 160, MLAs 170, platform-based cross-retailer categorization service 180, connected instances of each retailer's transaction data manager 181, and a cross-retailer catalogue maintained for cultures and for each retailer within a given culture.

Each retailer's item catalogue 112 is accessible to platform 161 and transaction processed are handled by a retailer-specific instance of transaction data manager 181. Transaction data is fed to item space and similarity manager 160 where culture specific vector spaces are created, and barcoded item codes are mapped to the corresponding vector spaces through barcoded item vectors generated by item space and similarity manager 160. Item space mapper and similarity manager 160 also creates a retailer-specific vector space for each retailer using that retailer's transaction data and that retailer's item catalogue. Any non barcoded item in a given retailer's transaction data or item catalogue (182) is detected by platform-based cross-retailer categorization service 180 causing platform-based cross-retailer categorization service 180 to provide the non-barcoded item code and an identifier for the retailer or the retailer's vector space to be passed as input to item space mapper and similarity manager 160. Item space mapper and similarity manager 160 returns item codes and similarity values for item code vectors plotted in the retailers vector space that are in proximity to the non-barcoded item code. Platform-based cross-retailer categorization service 180 identifies a closest barcoded item code from the returned item codes and similarity values. Platform-based cross-retailer categorization service 180 creates a linkage between the non-barcoded item code and the corresponding barcoded item code (which is mapped already with a retailers culture vector space). Platform-based cross-retailer categorization service 180 also uses mapped vectors within a given culture vector space and similarity values between the mapped item vectors to cluster the item codes within a given culture into cross-retailer categories or classifications. The linkage of each retailers non-barcoded item codes maintained on its corresponding linked barcoded item code within the classifications or clusters. The clusters or classifications for each culture along with the corresponding item codes (both barcoded and non-barcoded) are maintained with cross-retailer catalogue 190 for each retailer-specific item catalogue 112.

In an embodiment, any retailer that believes a categorization or cluster associated with a given item is wrong may provided feedback, which is then used to train MLAs 170 to learn how to correct and fine tune classifications or clusters for each specific retailer.

In an embodiment, the culture can be defined based on geographic constraints, income constraints, nationality constraints, or any common constraint associated with customers of multiple retailers that define a distinct group or segment of customers for those retailers.

In an embodiment, a single retailer can be associated with multiple different cultures and be associated with different groups of other retailers. So, some item codes of a given retailer's product catalogue 112 can include references or be associated with multiple different clustered categories generated by system 100A.

In an embodiment, components 110-113 and 160-190 are provided as a single cloud-based service to components 120, 140, and 150 via an API.

These and other embodiments are now discussed with reference to the FIGS. 2-3.

Figure 2:
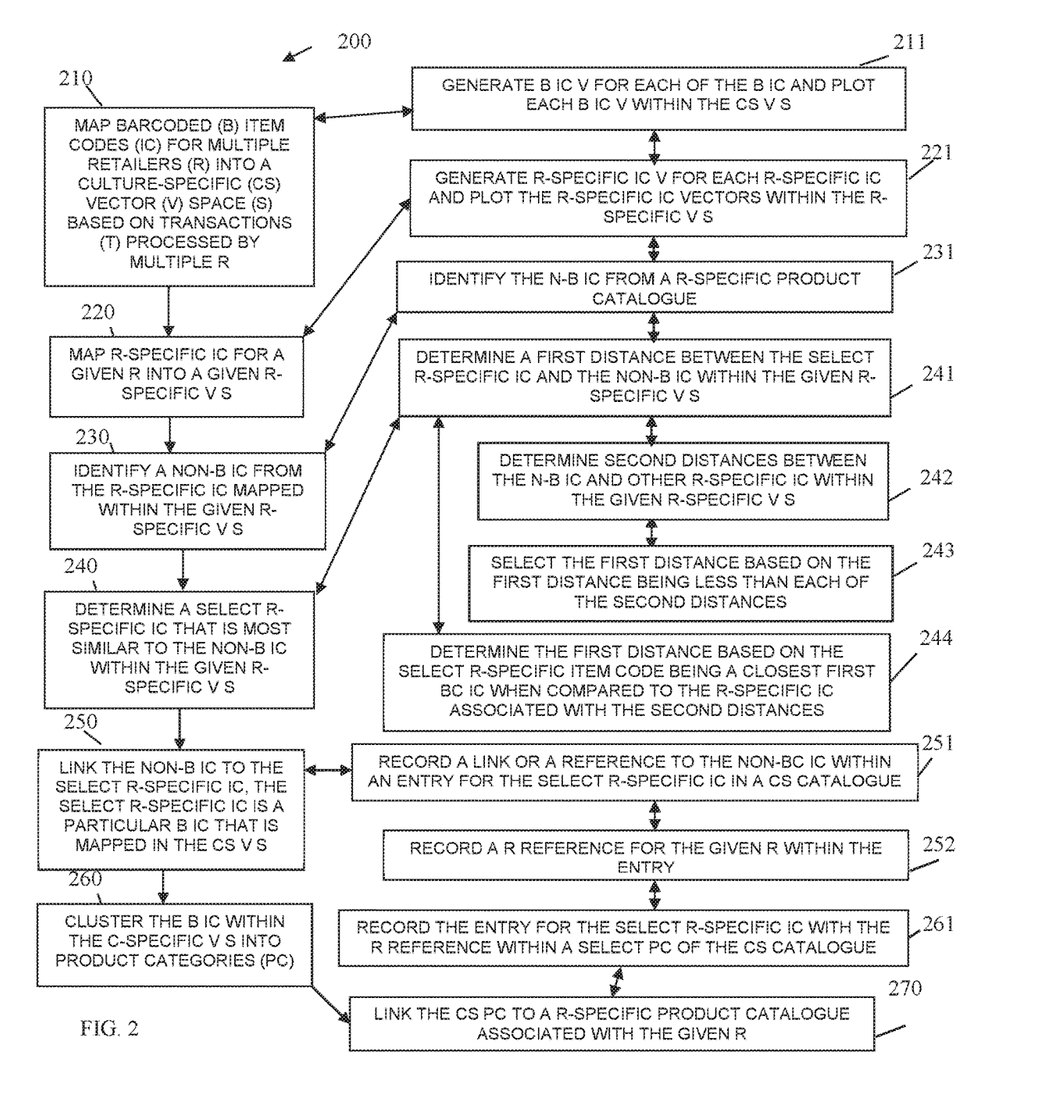
FIG. 2 is a diagram of a method for a platform-based cross-retail product categorization, according to an example embodiment.

FIG. 2 is a diagram of a method 200 for a platform-based cross-retail product categorization, according to an example embodiment. The software module(s) that implements the method 200 is referred to as a "cross-retailer item categorization service." The cross-retailer item categorization service is implemented as executable instructions programmed and residing within memory and/or a non-transitory computer-readable (processor-readable) storage medium and executed by one or more processors of a device. The processor(s) of the device that executes the cross-retailer item categorization service are specifically configured and programmed to process the cross-retailer item categorization service. The cross-retailer item categorization service has access to one or more network connections during its processing. The network connections can be wired, wireless, or a combination of wired and wireless.

In an embodiment, the device that executes the cross-retailer item categorization service is a server. In an embodiment, the server is a cloud processing environment that comprises multiple servers cooperating with one another as a single server. In an embodiment, the server is a Local Area Network (LAN) server.

In an embodiment, the cross-retailer item categorization service is all of or some combination of 160-190.

In an embodiment, the cross-retailer item categorization service performs the processing discussed above with system 100A and process flow 100B.

In an embodiment, the cross-retailer item categorization service is provided as a SaaS to a plurality of enterprises, each enterprise having a subscription relevant to its customers and enterprise data store 110.

At 210, the cross-retailer item categorization service map barcoded item codes for multiple retailers into a culture-specific vector space based on transactions processed by multiple retailers.

In an embodiment, the culture can be defined based on geographic constraints, income constraints, nationality constraints, or any common constraint associated with customers of multiple retailers that define a distinct group or segment of customers for those retailers.

In an embodiment, at 211, the cross-retailer item categorization service generates barcoded item code vectors for each of the barcoded item codes and plots each barcoded item code vector within the customer-specific vector space.

At 220, the cross-retailer item categorization service maps retailer-specific item codes into a given retailer-specific vector space.

In an embodiment of 211 and 220, at 221, the cross-retailer item categorization service generates retailer-specific item code vectors for each of the retailer-specific item codes and plots the retailer-specific item code vectors within the given retailer-specific vector space.

At 230, the cross-retailer item categorization service identifies a non-barcoded item code from the retailer-specific item codes mapped within the given retailer-specific vector space.

In an embodiment of 221 and 230, at 231, the cross-retailer item categorization service identifies the non-barcoded item codes from a retailer-specific product catalogue of the given retailer.

At 240, the cross-retailer item categorization service determines a select retailer-specific item code that is most similar to the non-barcoded item code within the given retailer-specific vector space.

In an embodiment of 231 and 240, at 241, the cross-retailer item categorization service determines a first distance between the select retailer-specific item code and the non-barcoded item code within the given retailer-specific vector space.

In an embodiment of 241 and at 242, the cross-retailer item categorization service determines second distances between the non-barcoded item code and other retailer-specific item codes within the given retailer-specific vector space.

In an embodiment of 242 and at 243, the cross-retailer item categorization service selects the first distance based on the first distance being less than each of the second distances to identify the select retailer-specific item code.

In an embodiment of 242 and at 244, the cross-retailer item categorization service determines the first distance based on the select retailer-specific item code being a closest first barcoded item code when compared to the retailer-specific item codes associated with the second distances.

At 250, the cross-retailer item categorization service links the non-barcoded item code to the select retailer-specific item code. The select retailer-specific item code is barcode and is a particular barcoded item code mapped in the culture-specific vector space at 210.

In an embodiment, at 251 the cross-retailer item categorization service records a link or a reference to the non-barcoded item code within an entry for the select retailer-specific item code in a culture-specific catalogue.

In an embodiment of 251 and at 252, the cross-retailer item categorization service records a retailer reference for the given retailer within the entry.

At 260, the cross-retailer item categorization service clusters the barcoded item codes within the culture-specific vector space into product categories.

In an embodiment of 252 and at 260, at 261, the cross-retailer item categorization service records the entry for the select retailer-specific item code with the retailer reference within a select product category of the culture-specific catalogue.

In an embodiment, at 270, the cross-retailer item categorization service clusters links the culture-specific product catalogue to a retailer-specific product catalogue associated with the given retailer.

Figure 3:
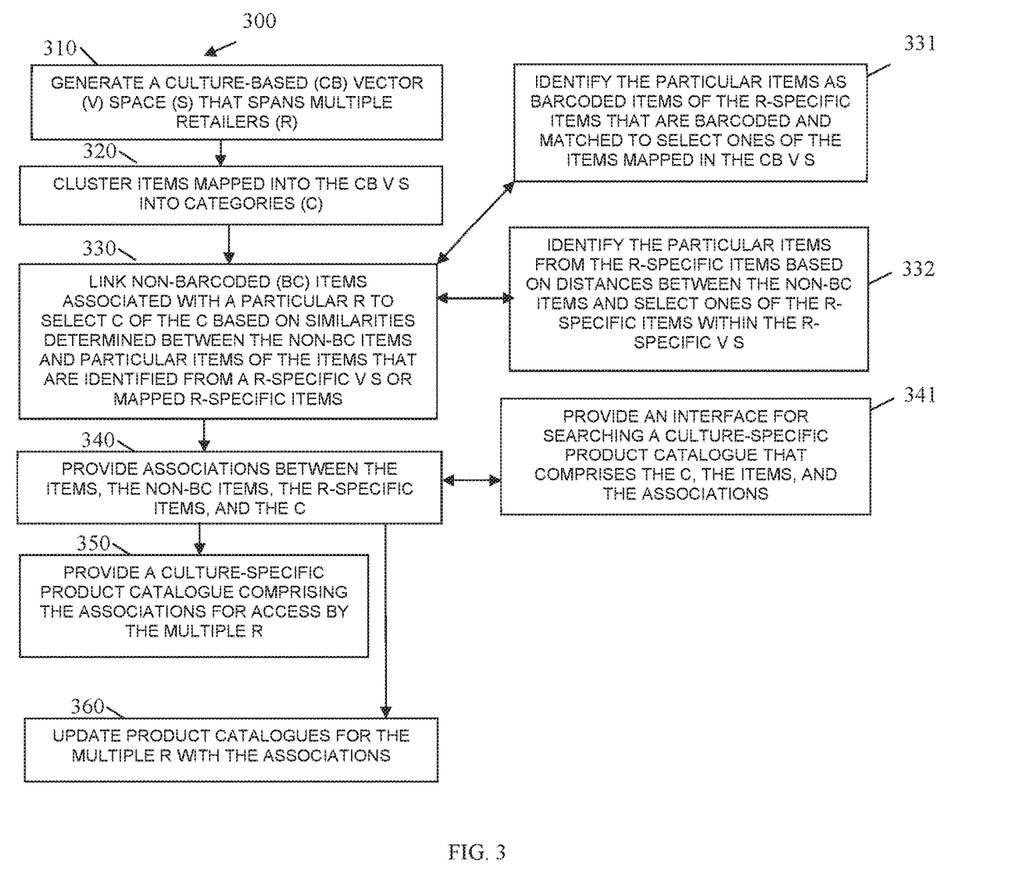
FIG. 3 is a diagram of another method for a platform-based cross-retail product categorization, according to an example embodiment.

FIG. 3 is a diagram of another method 300 for a platform-based cross-retail product categorization, according to an example embodiment. The software module(s) that implements the method 300 is referred to as a "culture and cross-retailer item classifier." The culture and cross-retailer item classifier is implemented as executable instructions programmed and residing within memory and/or a non-transitory computer-readable (processor-readable) storage medium and executed by one or more processors of a device. The processors that execute the culture and cross-retailer item classifier are specifically configured and programmed to process the culture and cross-retailer item classifier. The culture and cross-retailer item classifier has access to one or more network connections during its processing. The network connections can be wired, wireless, or a combination of wired and wireless.

In an embodiment, the device that executes the culture and cross-retailer item classifier is a server. In an embodiment, the server is a cloud processing environment that comprises multiple servers cooperating with one another as a single server. In an embodiment, the server is a LAN server that is local to a retail store.

In an embodiment, the item culture and cross-retailer item classifier is all or some combination of 160-190, process flow 100B, and/or the method 200.

The culture and cross-retailer item classifier presents another and, in some ways, enhanced processing perspective to that which was described above with the FIG. 2.

At 310, the culture and cross-retailer item classifier generates a culture-based vector space that spans multiple retailers based on cross-retailer transaction data captured for the retailers.

At 320, the culture and cross-retailer item classifier clusters items mapped into the culture-based vector space into categories.

At 330, the culture and cross-retailer item classifier links non-barcoded items associated with a particular retailer to select categories of the categories based on similarities determined between the non-barcoded items and particular items of the items that are identified from a retailer-specific vector space of mapped retailer-specific items.

In an embodiment, at 331, the culture and cross-retailer item classifier identifies the particular items as barcoded items of the retailer-specific items that are barcoded and matched to select ones of the items mapped in the culture-based vector space.

In an embodiment, at 332, the culture and cross-retailer item classifier identifies the particular items from the retailer-specific items based on distances between the non-barcoded items and select ones of the retailer-specific items within the retailer-specific vector space.

At 340, the culture and cross-retailer item classifier provides associations between the items, the non-barcoded items, the retailer-specific items, and the categories.

In an embodiment, at 341, the culture and cross-retailer item classifier provides an interface for searching a culture-specific product catalogue that comprises the categories, the items, and the associations.

In an embodiment, at 350, the culture and cross-retailer item classifier provides a culture-specific catalogue comprising the associations for access by the multiple retailers.

In an embodiment, at 360, the culture and cross-retailer item classifier update product catalogues for the multiple retailers with the associations.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method for predicting and providing, in real time, a certain similar item for a certain item in a certain transaction to a particular transaction system that is processing the certain transaction, comprising:

mapping, by a processor, barcoded item codes for multiple retailers into a culture-specific vector space based on transactions processed by multiple transaction systems and associated with the multiple retailers within a given geographical region, wherein the culture-specific vector space represented in a multidimensional space for item purchases processed by the multiple transaction system within the given geographical region, each item corresponds to a unique barcoded item code and each item represented and plotted as an item vector within the culture-specific vector space to defining contexts of purchases made for the corresponding item based on transaction data provided by the multiple transaction systems, wherein cultures associated with the culture-specific vector space are groupings or segments of customers selected based on customer geographic constraints, customer income constraints, or customer nationality constraints, wherein the culture-specific vector space includes aggregated transaction data for the customers that spans the multiple transaction systems for a given culture, wherein the mapping improves accuracy and efficiency of product categorization;

mapping, by the processor, retailer-specific item codes for a given retailer into a given retailer-specific vector space by defining the given retailer-specific vector space within the culture-specific vector space for the item purchases of the given retailer;

identifying, by the processor, a non-barcoded item code from the retailer-specific item codes mapped within the given retailer-specific vector space using a unique identification process that improves the reliability of matching products in a retail environment;

determining, by the processor, a select retailer-specific item code that is most similar to the non-barcoded item code within the given retailer-specific vector space based on distances associated with probabilities between plotted retailer-specific items within the given retailer-specific vector space, wherein determining further includes applying a probabilistic model that enhances predictions of consumer behavior;

linking, by the processor, the non-barcoded item code to the select retailer-specific item code, wherein the select retailer-specific item code is a particular barcoded item code that is mapped in the culture-specific vector space;

clustering, by the processor, the barcoded item codes within the culture-specific vector space into product categories using a clustering algorithm that operates in the defined multidimensional space; and providing, by the processor, the non-barcoded item code to a certain transaction system associated with the given retailer based on the select retailer-specific item code being provided by the certain transaction system during a given transaction with the certain transaction system, wherein the providing further includes communicating the non-barcoded item code to the certain transaction system to enhance real-time transaction communication during the given transaction.

2. The method of claim 1, wherein mapping the barcoded item codes further includes generating barcoded item code vectors for each of the barcoded item codes and plotting the barcoded item code vectors within the culture-specific vector space.

3. The method of claim 2, wherein mapping the retailer-specific item codes further includes generating retailer-specific item code vectors for each of the retailer-specific item codes and plotting the retailer-specific item code vectors within the retailer-specific vector space.

4. The method of claim 3, wherein identifying further includes identifying the non-barcoded item code from a retailer-specific product catalogue.

5. The method of claim 4, wherein determining further includes determining a first distance between the select retailer-specific item code and the non-barcoded item code within the given retailer-specific vector space.

6. The method of claim 5, wherein determining further includes determining second distances between the non-barcoded item code and other retailer-specific item codes within the given retailer-specific vector space.

7. The method of claim 6, wherein determining further includes selecting the first distance based on the first distance being less than each of the second distances.

8. The method of claim 6, wherein determining further includes determining the first distance based on the select retailer-specific item code being a closest first barcoded item code when compared to the retailer-specific item codes that are associated with the second distances.

9. The method of claim 1, wherein linking further includes recording a link or a reference to the non-barcoded item code within an entry for the select retailer-specific item code in a culture-specific product catalogue.

10. The method of claim 9, wherein recording further includes recording a retailer reference for the given retailer within the entry.

11. The method of claim 10, wherein clustering further includes recording the entry for the select retailer-specific item code with the retailer reference within a select product category of the culture-specific product catalogue.

12. The method of claim 11 further comprising, linking, by the processor, the culture-specific product catalogue to a retailer-specific product catalogue associated with the given retailer.

13. A method for predicting and providing certain item identifiers for certain items that are similar to non-barcoded items to a certain transaction system of a certain retailer, comprising:
generating, by a processor, a culture-based vector space that spans multiple retailers, wherein the culture-based vector space defined by transaction data for transactions within a given geographical region, each item purchased within the given geographical region plotted as an item vector within the culture-based vector space to define a context of the corresponding item and relationship of the corresponding item to other item vectors plotted within the culture-based vector space based on the corresponding transaction data for the corresponding transactions during which the corresponding item was purchased within the given geographical region, wherein cultures associated with the culture-based vector space are groupings or segments of customers selected based on customer geographic constraints, customer income constraints, or customer nationality constraints, wherein the culture-based vector space includes aggregated transaction data for the customers that spans the multiple transaction systems for a given culture;
clustering, by the processor, items mapped into the culture-based vector space into categories, wherein the clustering improves accuracy and efficiency of product categorization based on the generating and items mapped into the culture-based vector space by using a clustering algorithm that operates in the defined multidimensional space;
linking, by the processor, non-barcoded items associated with a particular retailer to a select categories of the categories based on similarities determined between the non-barcoded items and particular items of the items that are identified from a retailer-specific vector space of mapped retailer-specific items and other item vectors for other items plotted in the culture-based vector space, wherein the similarities determined by calculated distances between the item vectors of the particular retailer and the other item vectors of the culture-based vector space, wherein the distances are associated with assigned probabilities; and
providing, by the processor, associations between the items, the non-barcoded items, the retailer-specific items, and the categories during transactions at a transaction system associated with the particular retailer wherein the providing further includes communicating the associations to the transaction system to enhance real-time transaction communication during the transactions.

14. The method of claim 13 further comprising, providing, by the processor, a culture-specific product catalogue comprising the associations for access by the multiple retailers.

15. The method of claim 13 further comprising, updating, by the processor, product catalogues for the multiple retailers with the associations.

16. The method of claim 13, wherein linking further includes identifying the particular items as barcoded items of the retailer-specific items that are barcoded and matched to select ones of the items mapped in the culture-based vector space.

17. The method of claim 13, wherein linking further includes identifying the particular items from the retailer-specific items based on distances between the non-barcoded items and select ones of the retailer-specific items within the retailer-specific vector space.

18. The method of claim 13, wherein providing further includes providing an interface for searching a culture-specific product catalogue that comprises the categories, the items, and the associations.

19. A system, comprising:
at least one processing device having at least one processor configured to execute instructions from a non-transitory computer-readable storage medium;
the instructions when executed by the at least one processor from the non-transitory computer-readable storage medium cause the at least processor to perform operations comprising:
obtaining transaction data for transactions performed by multiple retailers from multiple transaction systems associated with the multiple retailers;

defining a culture that is associated with the multiple retailers based on a given geographical region associated with the multiple retailers, wherein the culture is a grouping or a segment of customers of the multiple retailers within the given geographic region;

filtering out the transaction data into filtered transaction data comprising culture-based transactions associated with the culture for the given geographical region;

defining a first vector space from the culture-based transactions for items purchased within the given geographical region, wherein the first vector space includes aggregated transaction data for corresponding customers that spans the multiple transaction systems for a given geographic region;

defining second vector spaces for the multiple retailers using the filtered transaction data associated with the corresponding retailers based on item purchases at each retailer, wherein each second vector space defined within the first vector space;

generating first barcoded item code vectors for first item codes of the culture-based transactions based on the first vector space by defining a context for each item purchased using the corresponding filtered transaction data and generating a corresponding first barcoded item code vector for the corresponding item;

plotting the first barcoded item code vectors within the first vector space;

for each retailer:
  generating second item code vectors for second item codes of the culture-based transactions based on the corresponding second vector space by defining a context for each item purchased at each retailer using the corresponding filtered transaction data and generating a corresponding second item code vector for the corresponding item;
  plotting the second item code vectors within the corresponding second vector space;
  for each second item code that lacks a barcode:
    find a closest mapped second item code vector associated with a particular second item code that comprises a barcode from the corresponding vector space based on calculated distances between the corresponding item code vectors;
    matching the particular second item code to a particular first item code associated with the first vector space using the calculated distances that are associated with probabilities; and
    linking the particular second item code to the particular first item code;
  clustering the first item code vectors from the first vector space into product categories, wherein the clustering improves accuracy and efficiency of product categorization by using a clustering algorithm that operates in the first vector space;
  providing the product categories for access by the multiple retailers in association with each retailer's second item codes; and
  providing each closest mapped second item code to corresponding transaction systems during transactions that includes the corresponding particular item code wherein the providing further includes communicating each closest mapped second item code to the corresponding transaction systems to enhance real-time transaction communication during corresponding transactions.

20. The system of claim 19, wherein the instructions are provided as a cross-retailer culture-based product categorization service over a network to retailer services associated with the multiple retailers.

* * * * *